Jan. 2, 1951     F. T. RICE     2,536,225
LIMIT TORQUE GAUGE
Filed May 18, 1946

Frank T. Rice
INVENTOR

BY
ATTORNEY

Patented Jan. 2, 1951

2,536,225

UNITED STATES PATENT OFFICE 2,536,225

LIMIT TORQUE GAUGE

Frank T. Rice, Los Angeles, Calif.

Application May 18, 1946, Serial No. 670,824

1 Claim. (Cl. 81—52.4)

This invention relates to a limit torque tool handle which is particularly adapted for use with gages such as cylindrical plug gages, thread plug gages, thread rings, etc.

There are numerous instances where it is highly desirable that a tool or gage be rotated but the torque delivered to the tool should not exceed a predetermined amount because of the possibility of shearing off, damaging, straining, or otherwise injuring either the tool itself or the material upon which the tool is being used. Threaded gages, for example, are rotated into internally threaded openings for the purpose of determining whether or not the thread conforms to predetermined standards. On many occasions the inspector or machinist will find that his gage does not readily and smoothly rotate and engage the threads of the bore, and will force the plug gage, occasionally even resorting to the use of a wrench on the handle of the gage in order to force the gage into the work. Obviously, such procedure not only impairs the accuracy of the gage but in addition defeats the purpose of using a gage.

It is an object of the present invention to disclose and provide a simple handle construction which does not materially increase the weight of the complete tool and which automatically prevents a gage or other tool from being forced beyond a reasonable point in applying the tool to the work.

A further object of the invention is to disclose and provide a limit torque tool handle capable of being applied to any tool or gage provided with a tapered shank so that a single handle may be used with a plurality of tools interchangeably.

These and other objects of the invention will become apparent to those skilled in the art from the following description of an exemplary embodiment illustrated in the appended drawings. In such drawings.

Figure 1:
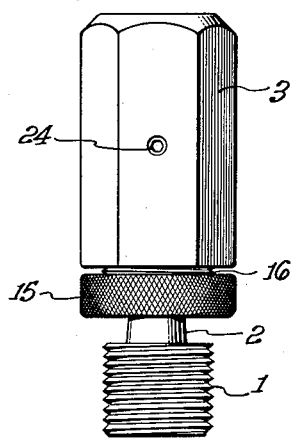
Fig. 1 is a side elevation of the tool handle as applied to an externally threaded gage.
Figure 2:
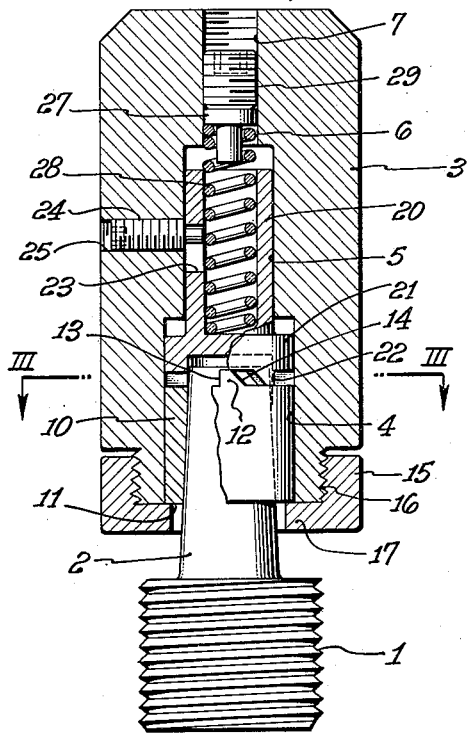
Fig. 2 is a somewhat enlarged longitudinal section through the tool handle of this invention, certain portions or elements being shown in elevation.

For purposes of illustration, the drawings show an externally threaded gage 1 provided with a tapered shank 2 associated with a handle constructed in accordance with this invention. The handle itself comprises a body member 3 provided with an axial bore. The lower end of the handle has a cylindrical axial recess 4 in communication with a counter bore 5 of somewhat reduced diameter, such counter bore communicating with a passageway 6 which is internally threaded as indicated at 7 adjacent the upper end of the handle.

Slidably mounted within the recess 4 is a cylindrical holding sleeve 10, the internal surface of which is tapered so as to firmly receive the tapered shank 2 of the tool by means of a pressed driving fit. The holding sleeve 10 has a plane lower end 11 and the inner end is provided with a plurality of upstanding ratchet teeth such as the teeth 12, one upstanding side of each tooth being parallel to the longitudinal axis of the handle as at 13, whereas the other side of each tooth is inclined as at 14.

The holding sleeve 10 is retained within the recess 4 by means of a locking collar 15 threadedly connected to the end of the body member as at 16, the collar including a lip 17, adapted to engage the lower end 11 of the holding sleeve so as to prevent withdrawal of the sleeve from the recess 4.

Slidably mounted within the counterbore 5 is a driver having a hollow body portion 20 and a somewhat enlarged head 21, the head being provided with crown ratchet teeth, such as 22, for engagement with the teeth 12 on the sleeve 10. Each of the crown ratchet teeth 22 is provided with a face lying in a plane passing through the longitudinal axis of the handle, and an inclined face.

The tubular body 20 of the driver is provided with a longitudinal slot 23 and means are provided for preventing rotation of the driver with respect to the body member 3. Such means may comprise a full dog set screw 24 of the hexagon socket type received within a transverse internally threaded bore 25 formed in the body member 3, the dog of the set screw extending into the slot 23.

A follower 27 is slidably positioned in the counter bore 6 and a suitable compression spring 28 bears against the follower 27 and the head 21 of the driver. The spring 28 is placed under suitable compression by means of a suitable set screw 29 (preferably of the socket type) in threaded engagement with the internally threaded portion 7 of the bore 6. In this manner the driver and its crown ratchet teeth 22 is firmly pressed against the holding sleeve 10.

It will be evident that when the handle member 3 is rotated in the desired direction so that the inclined faces of the teeth are in contact, the tool, such as the gage 1, will be rotated, but in the event the gage encounters an obstacle or other imperfection which would strain either the gage or the work upon which it is being used, the driver will slip upwardly along the inclined faces of the teeth and the entire handle 3 will rotate independently of the tool 1. The torque under which driving engagement between the driver and holding sleeve 10 will be released depends entirely upon the compression of spring 28. Such compression may be adjusted by means of the set screw 29 and after being adjusted the recess immediately above the set screw and the upper end of the handle may be filled with wax or other sealing substance so as to prevent tampering with the tool. Positive withdrawal of the gage from a bore in which it has been wedged is attained by rotating the handle in the opposite direction, whereupon the axial faces, such as 13 and 22, of the ratchet teeth will positively engage and permit the tool to be withdrawn from the bore.

Figure 4:
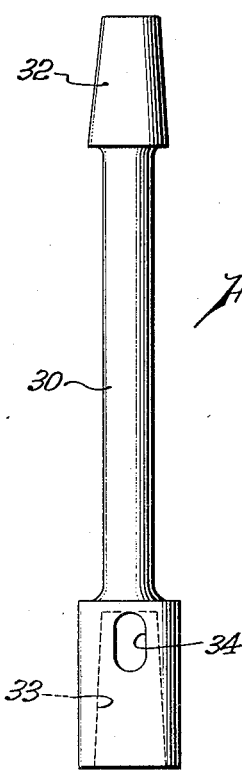
Fig. 4 is an elevation of an extension member which may be employed with the tool handle.
Figure 3:
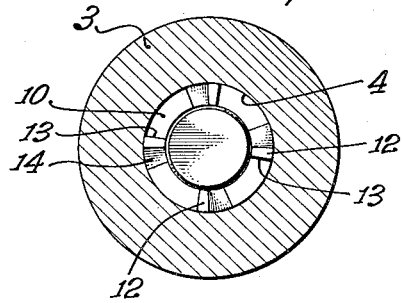
Fig. 3 is a transverse section taken along the plane III—III of Fig. 2.

As shown in Fig. 4, various extension members may be employed with the handle. The extension element of Fig. 4 comprises a shank 30 having the tapered portion 32 adapted to be connected by a driving forced fit to the holding collar 10. The opposite end of the shank 30 is provided with an internal tapered bore 33 adapted to receive the tapered shank of a tool. The side wall of the internally tapered end portion of the extension or adapter may be provided with opposing slots 34 so that when it is desired to remove the tool from the internally tapered bore 33, a wedge may be inserted through the slots 34 to force it out of its engagement with the internally tapered bore.

It is to be understood that instead of using the internally tapered bore 33 on the lower end of the adapter, such lower end may be provided with other means for removably attaching various tools thereto, or the shank 30 may itself terminate in a suitable tool.

Whenever the shank 30 is provided with a removable tool or in itself terminates in a relatively small tool, the upper end of such shank need not carry a taper 32 but may be formed with a holding sleeve 10. Such holding sleeve carrying the upper end of the shank 30 can be readily inserted into the body of the handle and held in place by the collar 15.

All changes and modifications coming within the scope of the appended claim are embraced thereby.

I claim:

A limit torque tool handle adapted to receive and hold a tool having a tapered shank, consisting of: a handle body having an externally threaded end, an axial cylindrical recess at such end, an aligned counterbore of reduced diameter in communication with the bottom of said recess, and a coaxial internally threaded bore in the other end of the body and in communication with the counterbore; a holding sleeve with integral ratchet teeth and a tapered internal surface to receive a tapered shank of a tool with a pressed driving fit, said holding sleeve being rotatably and removably held in the recess; a removable retaining ring on the externally threaded end of the handle body including a lip for retaining the holding sleeve in the recess; a driver provided with a hollow shank slidably extending into the counterbore and an integral head in the recess, said head having crown ratchet teeth engageable with the ratchet teeth on the holding sleeve; a spring within the hollow shank of the driver; a selectively positionable follower in the internally threaded bore of the handle body and bearing against said spring to urge the driver axially into engagement with the holding sleeve; and means carried by the handle body and engageable with the shank of the driver to transmit rotation of the handle to the driver.

FRANK T. RICE.

REFERENCES CITED

The following references are of record in the file of this patent:

UNITED STATES PATENTS

| Number | Name | Date |
|---|---|---|
| 717,199 | Hollm | Dec. 30, 1902 |
| 1,298,504 | Hollingshead | Mar. 25, 1919 |
| 1,881,633 | Johnson | Oct. 11, 1932 |
| 2,150,343 | Schieber | Mar. 14, 1939 |
| 2,293,786 | Worden | Aug. 25, 1942 |
| 2,396,040 | Darling | Mar. 5, 1946 |